(12) United States Patent
Buehlmann et al.

(10) Patent No.: US 7,923,262 B2
(45) Date of Patent: Apr. 12, 2011

(54) METHOD OF MANUFACTURING PATTERNED FERROELECTRIC MEDIA

(75) Inventors: Simon Buehlmann, Suwon (KR); Seung-bum Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 11/384,326

(22) Filed: Mar. 21, 2006

(65) Prior Publication Data

US 2006/0211154 A1 Sep. 21, 2006

Related U.S. Application Data

(60) Provisional application No. 60/665,830, filed on Mar. 29, 2005.

(30) Foreign Application Priority Data

Mar. 21, 2005 (KR) .................. 10-2005-0023243

(51) Int. Cl.
*H01L 21/00* (2006.01)
(52) U.S. Cl. .............. 438/3; 257/E27.104; 257/E29.164
(58) Field of Classification Search .......... 438/3
See application file for complete search history.

(56) References Cited

U.S. PATENT DOCUMENTS

| | | | |
|---|---|---|---|
| 5,777,977 A | 7/1998 | Fujiwara et al. | |
| 5,985,404 A | 11/1999 | Yano et al. | |
| 2004/0161887 A1* | 8/2004 | Hasegawa et al. | 438/200 |

FOREIGN PATENT DOCUMENTS

| JP | 63278388 | * 11/1988 |
|---|---|---|
| JP | 5-85704 | 4/1993 |

OTHER PUBLICATIONS

Auciello et al. "Synthesis and characterization of Pb(ZrxTi1-x)O3 thin films produced by an automated Isser ablation deposition technique." J. Appl. Phys. 73 (10), May 15, 1993.*

Hisao Suzuki, et al.; "Low-Temperature Processing of Ferroelectri Pb($Zr_{0.53}Ti_{0.47}$)$O_3$ Thin Film from Molecular-Designed Alkoxide Precursor Solution"; Jpn. J. Appl. Phys. vol. 35 (1996) Pt. 1, No. 9B; pp. 4896-4899; Sep. 1996; XP-000703044.

M.S.J. Nunes, et al.; "Microstructural and ferroelectric properties of Pb$Zr_{1-x}Ti_xO_3$ thin films prepared by the polymeric precursor method"; Materials Letters 49 2001); pp. 365-370; Jul. 2001.

* cited by examiner

*Primary Examiner* — Marcos D. Pizarro
*Assistant Examiner* — Eva Yan Montalvo
(74) *Attorney, Agent, or Firm* — Sughrue Mion, PLLC

(57) ABSTRACT

A method of manufacturing patterned ferroelectric media, which includes forming an electrode on a substrate; forming features having a predetermined pattern on the electrode, the features including a precursor for forming a ferroelectric material; and reacting a source material with the precursor features to transform the precursor features into ferroelectric features. Also disclosed is a method which includes forming on a substrate an electrode having wells and precursor features formed in the wells of the electrode, the precursor features including a precursor for forming a ferroelectric material; and reacting a source material with the precursor features to transform the precursor features into ferroelectric features. The above first embodiment relates to non-embedded type media, and the above second embodiment relates to embedded type media.

23 Claims, 15 Drawing Sheets

7 (ORGANOMETALLIC COMPOUND CONTAINING Ti)

US 7,923,262 B2

METHOD OF MANUFACTURING PATTERNED FERROELECTRIC MEDIA

CROSS-REFERENCE TO RELATED PATENT APPLICATIONS

This application claims the benefit of Korean Patent Application No. 10-2005-0023243, filed on Mar. 21, 2005, in the Korean Intellectual Property Office, and U.S. Patent Provisional Application No. 60/665,830 filed on Mar. 29, 2005, in the U.S.P.T.O., the disclosures of which are incorporated herein by reference in their entirety.

BACKGROUND OF THE INVENTION

1. Field of the Invention

The present invention relates to a method of manufacturing patterned ferroelectric media, and more particularly, to a method of transforming patterned precursor features into ferroelectrics.

2. Description of the Related Art

Media having a plurality of high-density patterned ferroelectric features are used in probe storage devices.

Each feature in a ferroelectric film corresponds to one bit of memory. In order to improve the recording density of media using a ferroelectric film, the size of a feature corresponding to a unit memory should be reduced and accordingly, the memory bit density per unit area of media should be increased. In order to increase the bit density, the ferroelectric film must be formed to have a small thickness of approximately 2-10 nm, for example. In addition to an increase in bit density, improvement of uniformity of a physical property of the media is important. That is, a ferroelectric substance used in forming features has a fine grain structure or may be a single crystal having small interface defects or may be defect free.

It is well-known that a ferroelectric film is damaged in an etching process during lithography. For example, a PTO (PbTiO$_3$) film is formed on an electrode, such as Pt, and then, the PTO film is patterned into features using lithography etc. During etching, PTO is damaged and the physical property of PTO is degraded. Thus, damage to the PTO is desirably prevented. In addition, a method of manufacturing PZT is the same as the above-mentioned method. Thus, there is also a need to prevent or suppress damage to PZT caused by patterning.

SUMMARY OF THE INVENTION

The present invention provides a method of patterning a plurality of ferroelectric features while imparting little damage and having good physical properties.

The present invention also provides an easy manufacturing method for producing ferroelectric features which allows for good process control.

According to a first aspect, the present invention provides a method of manufacturing patterned ferroelectric media, the method including: forming an electrode on a substrate; forming features having a predetermined pattern on the electrode, said features comprising a precursor for forming a ferroelectric material; and reacting a source material with the precursor features to transform the precursor features into ferroelectric features.

According to a second aspect, the present invention provides a method of manufacturing a patterned ferroelectric media, the method including: forming on a substrate an electrode having wells and precursor features formed in the wells of the electrode, said precursor features comprising a precursor for forming a ferroelectric material; and reacting a source material with the precursor features to transform the precursor features into ferroelectric features.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. However, the present invention should not be construed as being limited thereto.

Media manufactured according to the present invention can be classified into embedded type media and non-embedded type media according to the shape of the respective features.

Figure 1A:
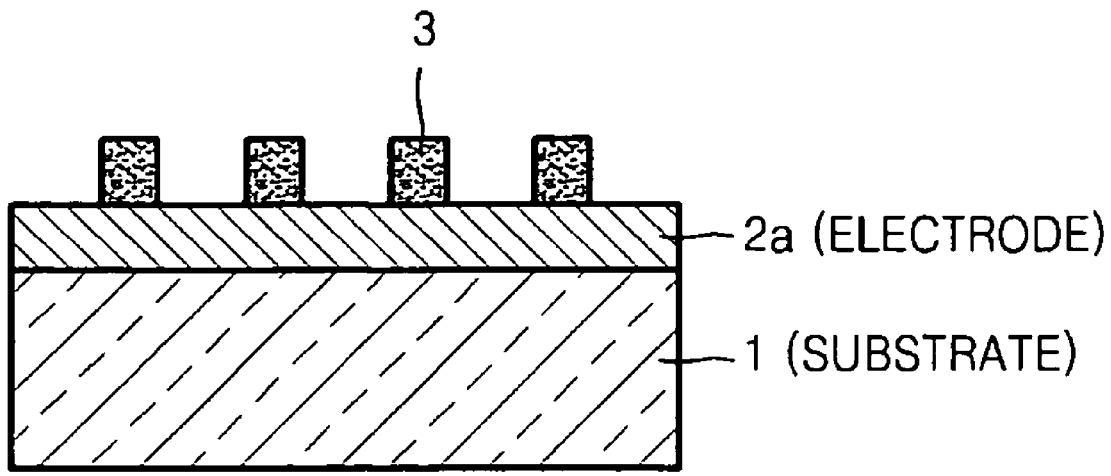
FIGS. 1A and 1B are cross-sectional views of media manufactured according to the present invention.

In media having non-embedded type features illustrated in FIG. 1A, a flat electrode 2a is formed on a substrate 1 and a plurality of island-shaped features 3 protrude from the electrode 2a at predetermined intervals.

Figure 1B:
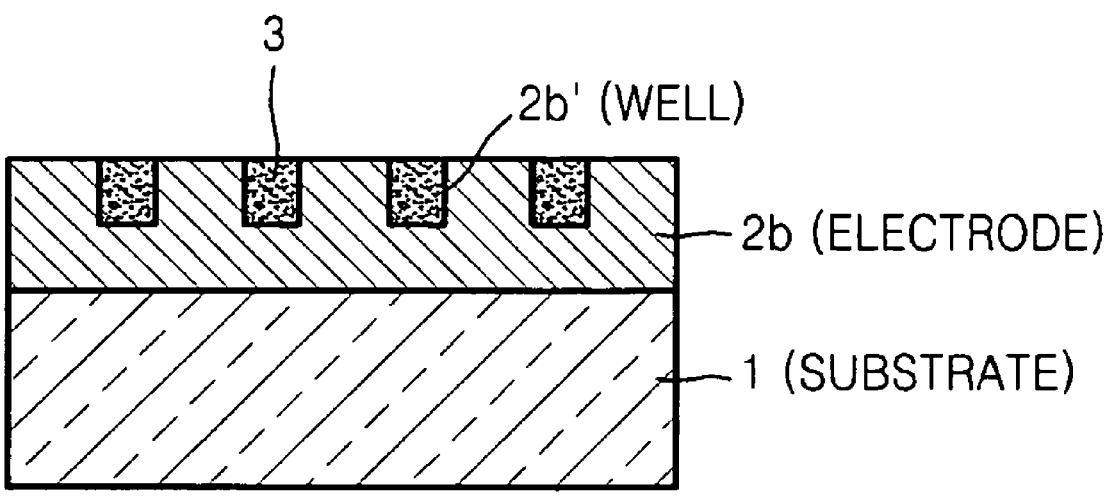

In media having embedded type features illustrated in FIG. 1B, an electrode 2b having a plurality of wells 2b' disposed at predetermined intervals is formed on the substrate 1 and ferroelectric features 3 are located in each of the wells 2b'.

A characteristic feature of the method of manufacturing ferroelectric media according to the present invention is that patterning is not performed on the functional (here ferroelectric) material. Patterning is performed on the electrode and/or on a precursor layer. The patterned precursor features are then reacted with a source material, thereby obtaining patterned ferroelectric features.

Figure 2A:
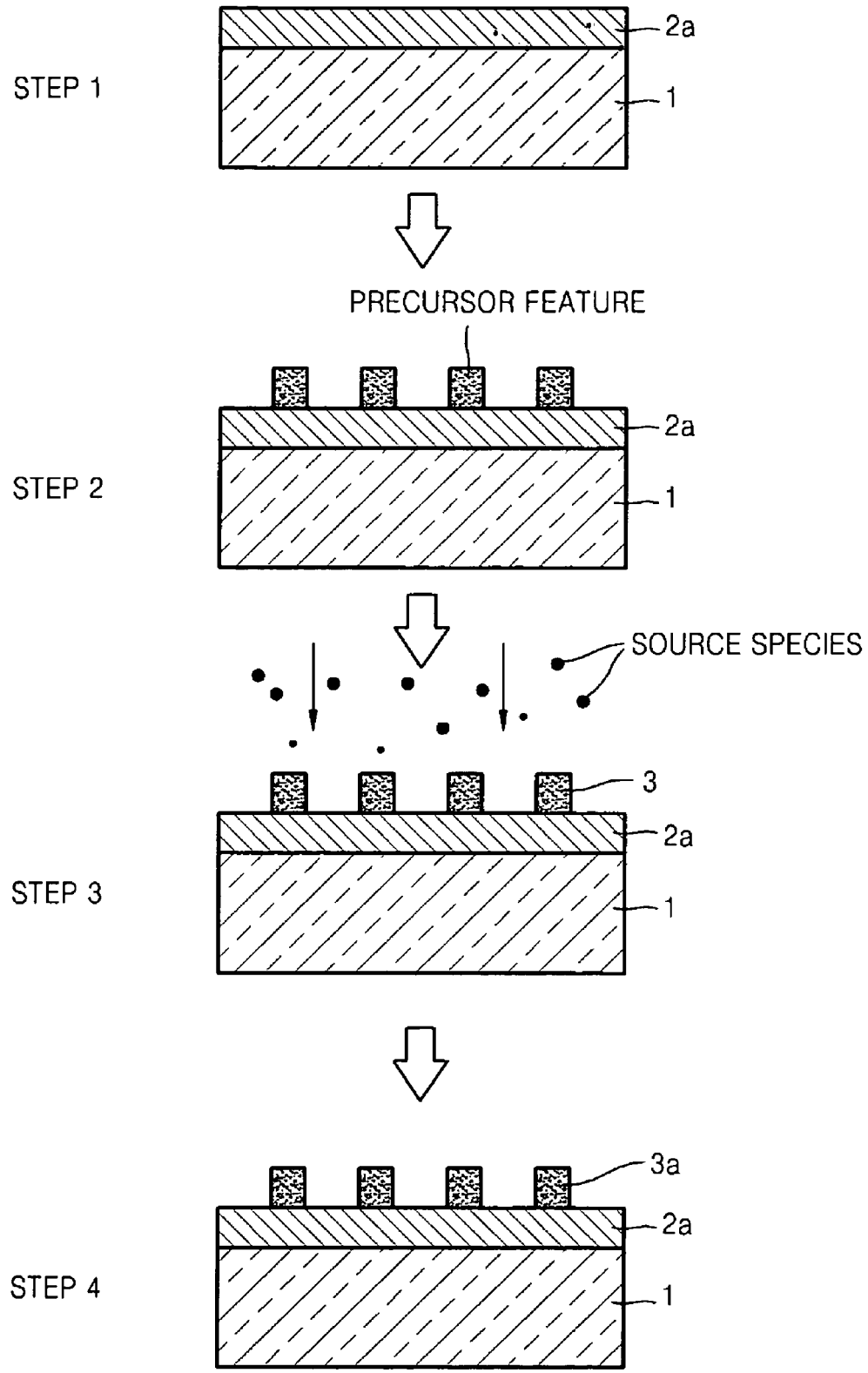
FIGS. 2A and 2B are flowcharts of schematic steps for manufacturing non-embedded and embedded features according to first and second aspects of the present invention, respectively.

First, a method of manufacturing media having non-embedded type features will be briefly described with reference to FIG. 2A.

First, an electrode 2a is formed on a substrate 1 (step 1), and precursor features 3 are formed on the electrode 2a (step 2). There are various methods of forming the features, such as photolithography or lift-off, embodiments of which will be described below.

After the precursor features 3 are formed, the precursor features 3 are thermally reacted with source species (step 3), thereby obtaining transformed ferroelectric features 3a (step 4).

A method of manufacturing media having embedded type features will now be described.

Figure 2B:
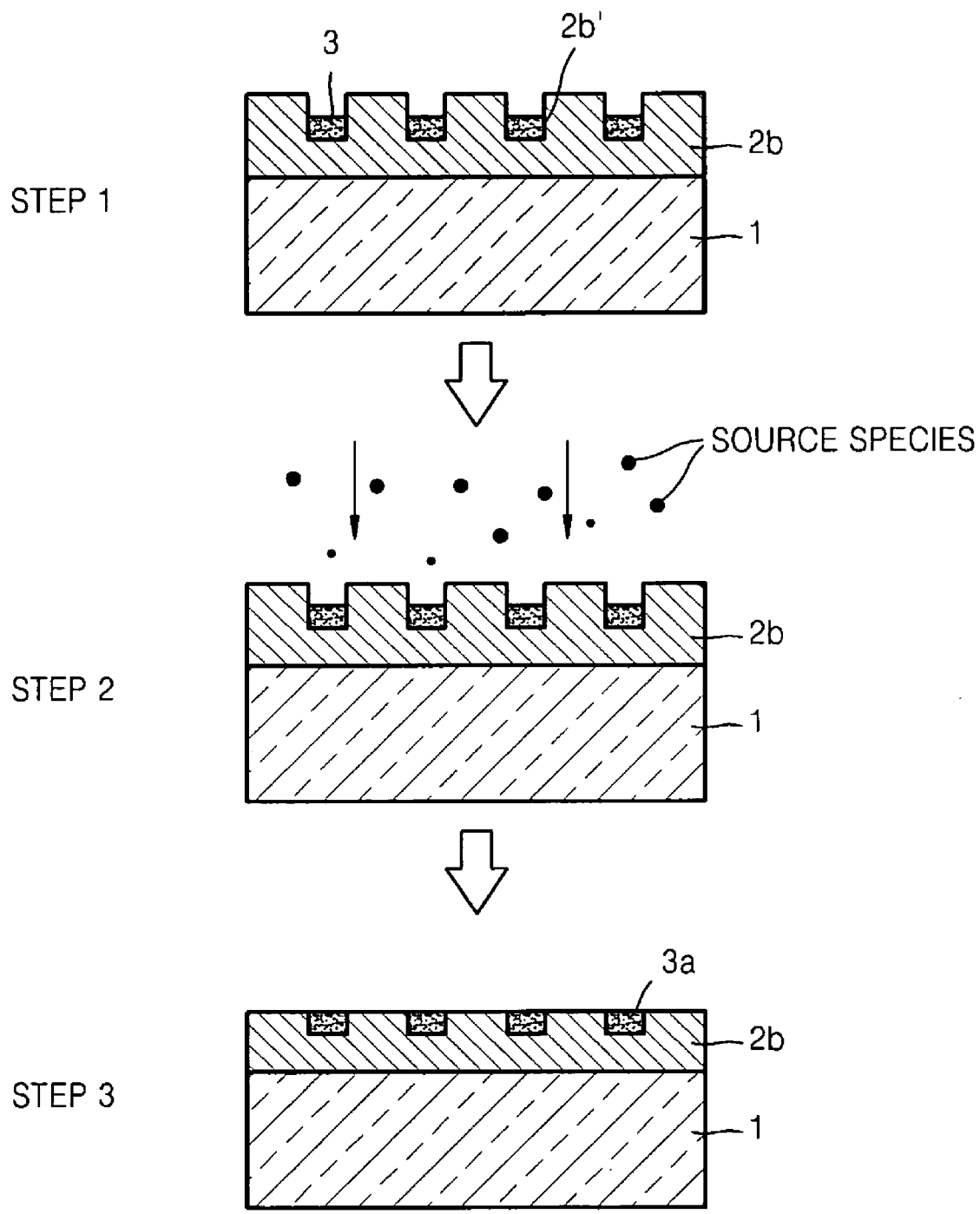

Referring to FIG. 2B, an electrode 2b having wells is formed on a substrate 1 and precursor features 3 are formed in the wells 2b' of the electrode 2b' (step 1). As described above, there are various methods of forming an electrode having wells and features in the wells, embodiments of which will be described below. Subsequently, the precursor features 3 thermally react with source species (step 2), thereby obtaining ferroelectric features 3a (step 3). To adjust the surface roughness, an additional planarization step may or may not be needed.

A method of forming each stack of the non-embedded type media and the embedded type media, which have been schematically described above, will now be described.

<Electrode Formation>

Figure 3A:
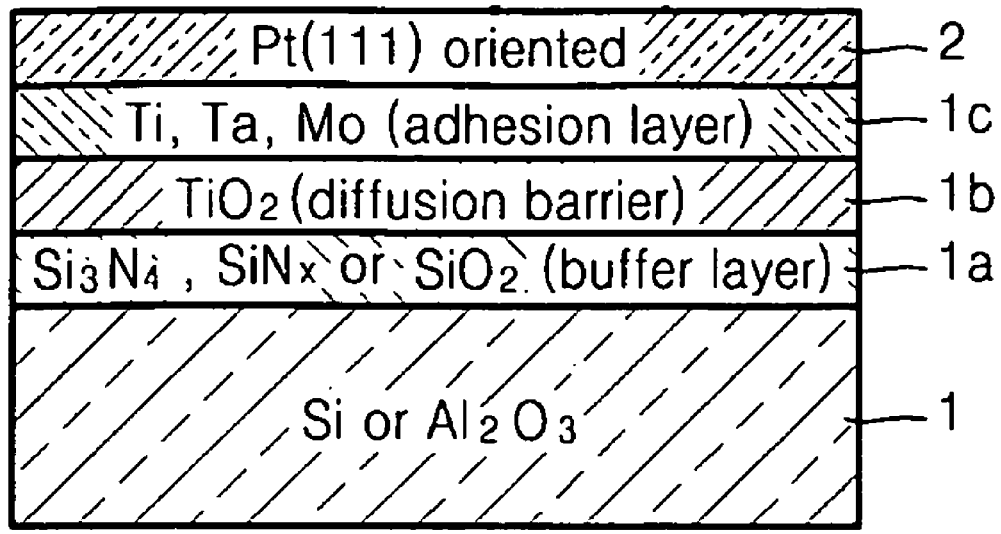
FIGS. 3A and 3B are cross-sectional views of an electrode of the media and a stack structure under the electrode, respectively.

Referring to FIG. 3A, a buffer layer 1a is formed of $SiO_2$, $SiN_x$ or $Si_3N_4$ on a substrate 1, for example, a sapphire substrate or a silicon wafer, a diffusion barrier 1b is formed, for example, of $TiO_2$ on the buffer layer 1a, and a metal electrode 2 is formed on the adhesion layer 1c. The metal electrode 2 is formed of a material, for example, Pt, that does not react with the source material (for example PbO). An adhesive layer 1c formed of Ti, Zr, Ta or Mo is arranged between the metal electrode 2 and the diffusion barrier 1b. The adhesion layer may also act as a diffusion barrier, the layer 1b being omitted in that case.

In general, all layers can be formed by conventional thin film deposition processes, such as, for example, evaporation, sputtering, chemical vapor deposition, pulsed laser deposition, thermal oxidation, and other techniques. The electrode 2 is formed to a thickness of less than 300 nm for example by magnetron sputtering of Pt. In this case, the adhesive layer 1c between the diffusion barrier 1b and the electrode 2 is formed prior to the electrode 2, such that adhesion of the Pt electrode 2 can be enhanced.

The buffer layer 1a, the diffusion barrier 1b, and the adhesive layer 1c are optional elements, and a preferable stack structure is Pt/adhesion layer/$SiO_2$/Si or Pt/adhesion layer/$Si_3N_4$/Si.

The description of a structure and method in which a metal electrode, for example, a platinum electrode is formed on the above-mentioned substrate, is not particularly limited to specific techniques described herein and can be implemented by additional various methods using existing thin film and thick film formation technology.

Figure 3B:
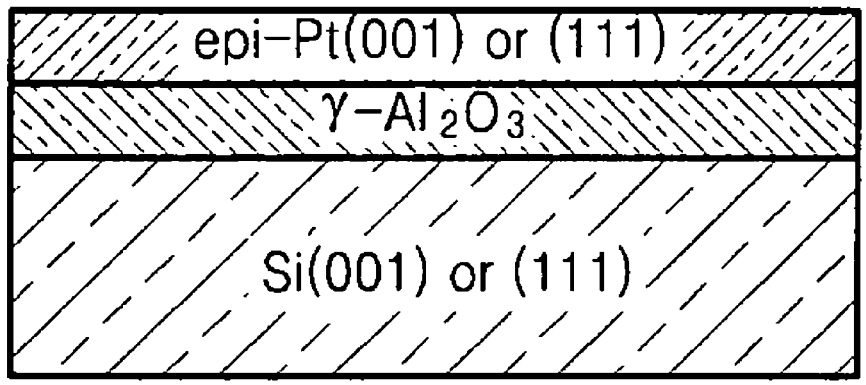

FIG. 3B illustrates a Pt electrode that is grown epitaxially on a silicon substrate. This technique improves thickness, orientation and roughness control. The precursor material may also be epitaxially grown on Pt. The formed ferroelectric material may be or may not be epitaxial. In order to achieve epitaxial growth of Pt on Si, intermediate layers, such as for example γ-$Al_2O_3$, MgO, TiN, ZrN, $SrTiO_3$, YSZ (($Y_2O_3$)$_x$($ZrO_2$)$_{(1-x)}$) and Ir may be used.

<Formation of Non-embedded Type Features>

Figure 4A:
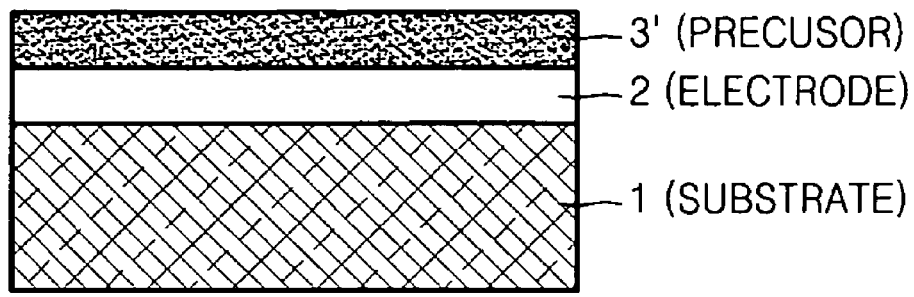
FIGS. 4A through 4C illustrate a method of manufacturing patterned ferroelectric media according to an embodiment of the present invention.
Figure 4B:
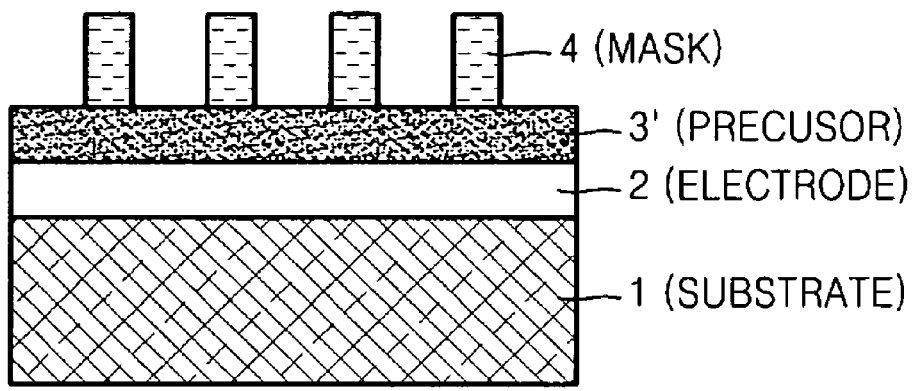
Figure 4C:
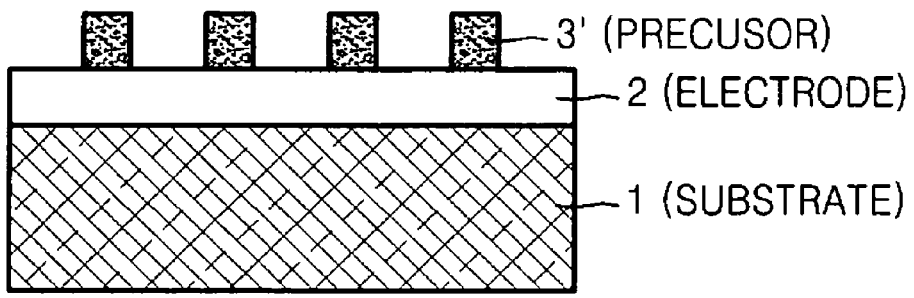

FIGS. 4A through 4C illustrate an example of a process of forming non-embedded type features.

Referring to FIG. 4A, a precursor thin film 3' is formed on an electrode 2 formed in a previous process.

Referring to FIG. 4B, a mask layer 4 is formed on the precursor thin film 3'. The mask layer 4 is formed of a photoresist using nano imprint, electron beam lithography or existing wet or dry photolithography, etc.

Referring to FIG. 4C, an exposed portion of the precursor thin film 3' that is not covered with a mask layer 4 is removed using dry etching and then, the mask layer 4 is removed, thereby obtaining desired precursor features 3'.

FIGS. 5A through 5E illustrate another example of a process of forming non-embedded type features.

Figure 5A:
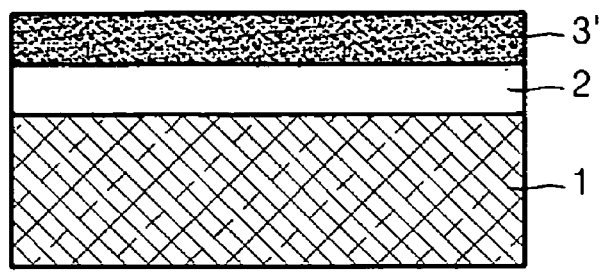
FIGS. 5A through 5E illustrate a method of manufacturing patterned ferroelectric media according to another embodiment of the present invention.

Referring to FIG. 5A, the precursor thin film 3' is formed on the electrode 2 formed in a previous process.

Figure 5B:
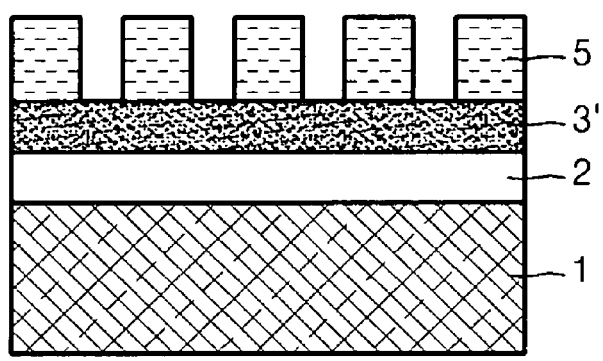

Referring to FIG. 5B, a sacrificial layer 5 is formed on the precursor thin film 3'. The sacrificial layer 5 is formed of a photoresist using nano imprint, electron beam lithography or existing wet or dry photolithography, etc.

Figure 5C:
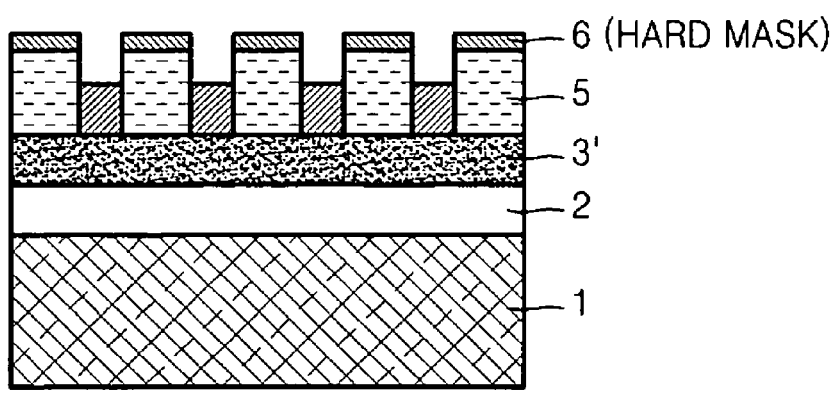

Referring to FIG. 5C, a mask layer 6 is formed on the sacrificial layer 5 and the precursor thin film 3' that is not covered with the sacrificial layer 5. The mask layer 6 is deposited using a material, such as for example Cr or Ni, as an etching-preventing material.

Figure 5D:
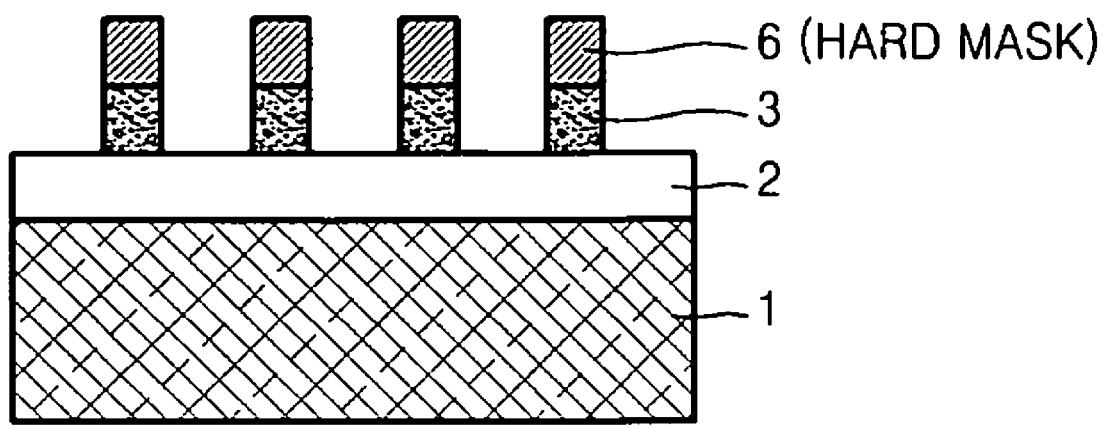

Referring to FIG. 5D, lift-off is performed to remove the sacrificial layer 5, thereby removing a hard mask material on the sacrificial layer 5.

Figure 5E:
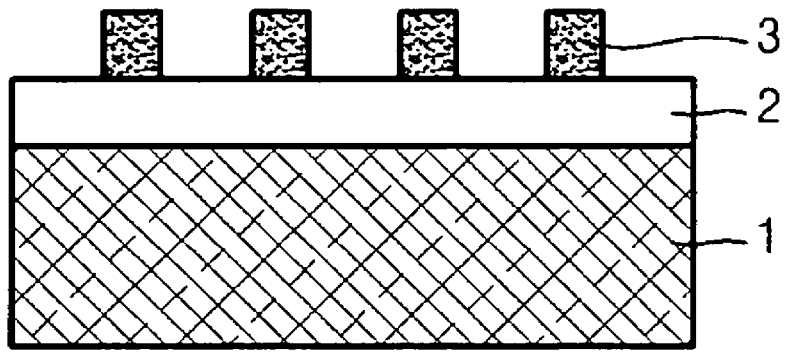

Referring to FIG. 5E, the mask layer 5 is removed, thereby obtaining the desired non-embedded type features 3.

FIGS. 6A through 6D illustrate an example of a process of forming non-embedded type features using an organometallic compound.

Figure 6A:
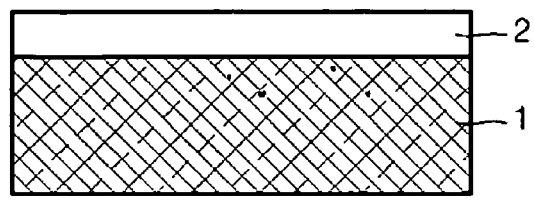
FIGS. 6A through 6D illustrate a method of manufacturing patterned ferroelectric media according to another embodiment of the present invention.

Referring to FIG. 6A, an electrode 2 is formed on a substrate 1.

Figure 6B:
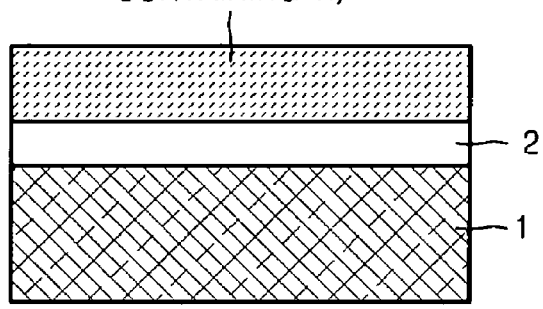

Referring to FIG. 6B, an organometallic compound layer 3" containing Ti is formed on the electrode 2.

Figure 6C:
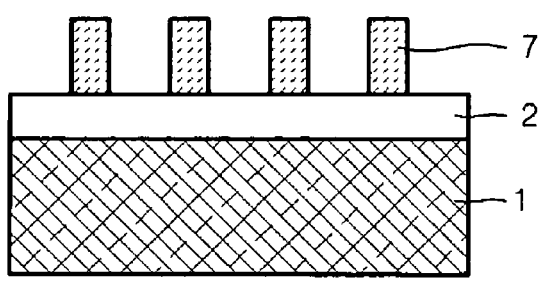

Referring to FIG. 6C, the organometallic compound layer 3" is patterned, thereby forming organic compound features 7. In this case, if a photosensitive material is included in the organometallic compound layer 3", the organic compound features 7 can be patterned using photolithography. Other examples of useful patterning methods include an electron beam lithography method and an imprint method of mechanically imprinting a pattern.

Figure 6D:
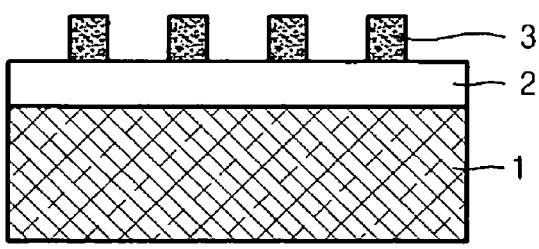

Referring to FIG. 6D, the precursor features 3 are obtained by removing the organic material. This can be done, for example, in a thermal oxygen treatment or by treating the organometallic material in an oxygen plasma.

Figure 7A:
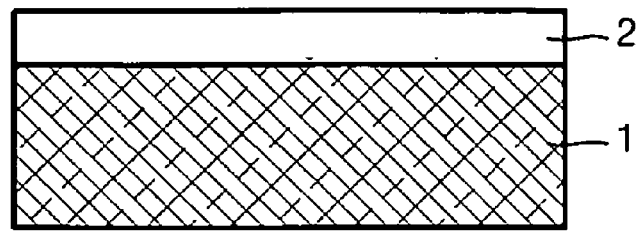
FIGS. 7A through 7C illustrate a method of manufacturing patterned ferroelectric media according to another embodiment of the present invention.
Figure 7B:
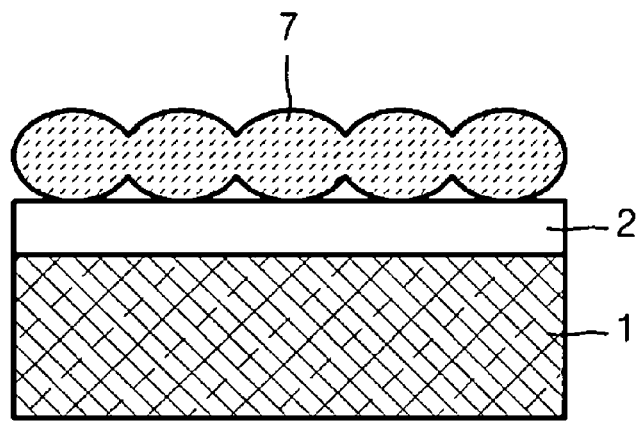
Figure 7C:
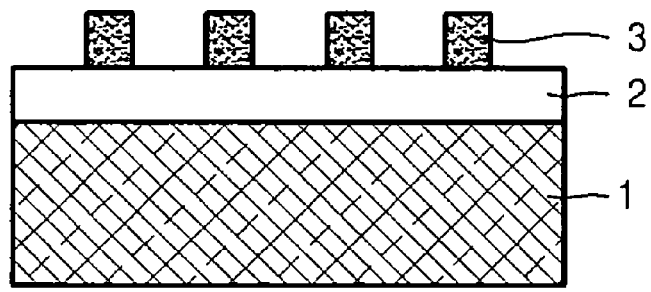

FIGS. 7A through 7C illustrate another example of a process of forming non-embedded type features using an organometallic compound.

Referring to FIG. 7A, an electrode 2 is formed on a substrate 1.

Referring to FIG. 7B, an organometallic compound layer 7 for self-assembly and containing Ti is formed to a very small thickness on the electrode 2. The organometallic compound layer 7 self-assembles into nanostructures, such as, for example, micelles.

Referring to FIG. 7C, the precursor features 3 are obtained by removing the organic material. This can be done, for example, in a thermal oxygen treatment or by treating the organometallic material in an oxygen plasma.

<Formation of embedded type features>

Embedded type features are features embedded in an electrode, as described above, and an embodiment of a method of manufacturing embedded type features will now be described.

Figure 8A:
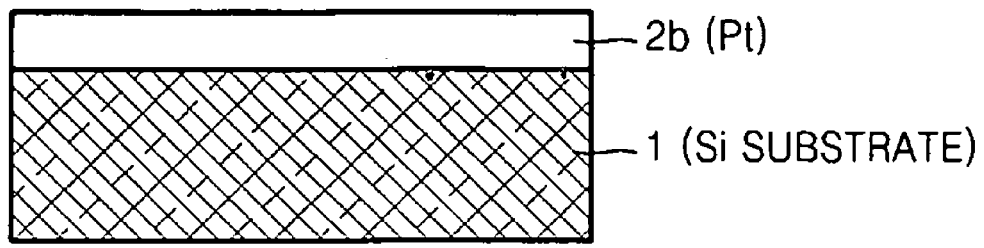
FIGS. 8A through 8C illustrate a method of manufacturing patterned ferroelectric media according to another embodiment of the present invention.

Referring to FIG. 8A, a Pt electrode 2b is formed on a substrate 1, which may be a Si substrate.

Figure 8B:
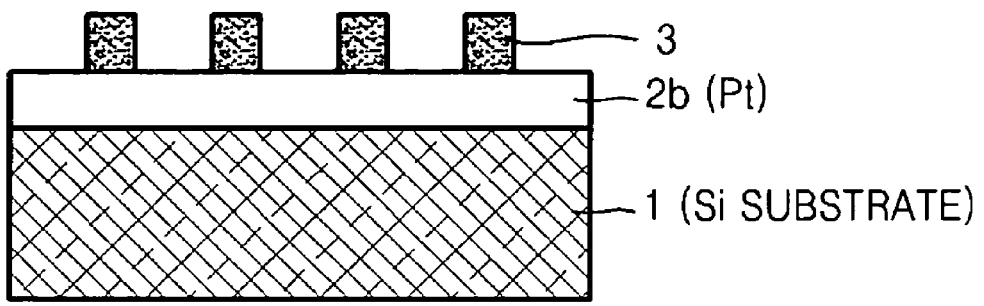

Referring to FIG. 8B, precursor features 3 are formed on the Pt electrode 2b. The precursor features 3 can be formed using the above-mentioned methods.

Figure 8C:
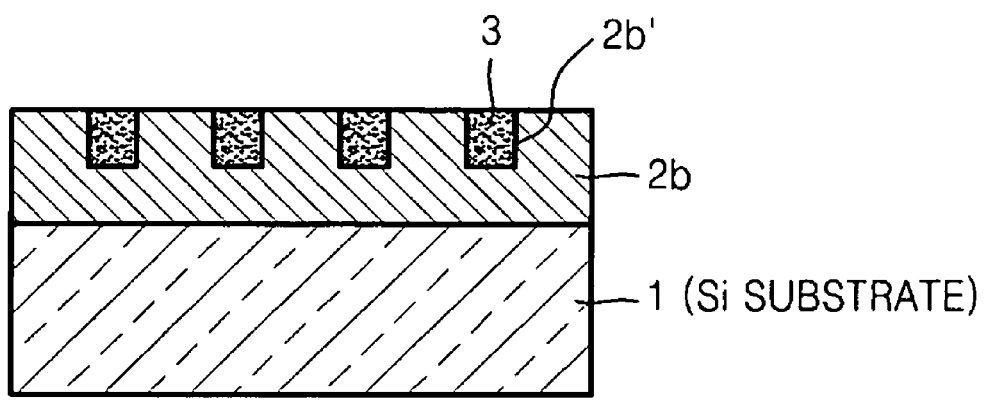

Referring to FIG. 8C, Pt is deposited to a sufficient thickness, thereby burying a side of the precursor features 3. Pt is not deposited on the precursor features 3, because of the low surface energy of the precursor, but only on the electrode 2b so that the electrode 2b has wells 2b' in which the precursor features 3 are embedded.

FIGS. 9A through 9D illustrate another embodiment of a method of manufacturing embedded type features.

Figure 9A:
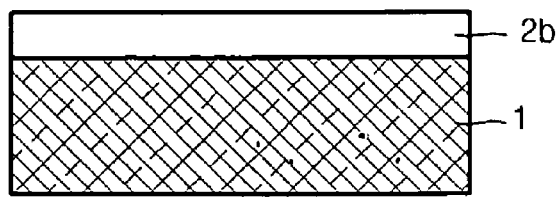
FIGS. 9A through 9E illustrate a method of manufacturing patterned ferroelectric media according to another embodiment of the present invention.

Referring to FIG. 9A, a Pt electrode 2b is formed on a substrate 1.

Figure 9B:
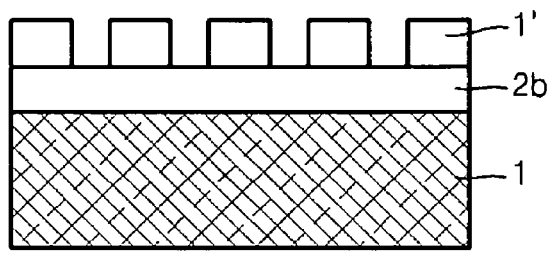

Referring to FIG. 9B, a sacrificial layer 1' is formed on the electrode 2b and patterned.

Figure 9C:
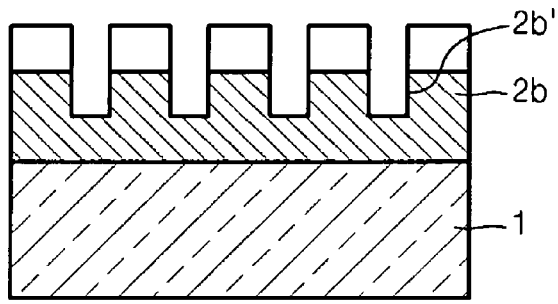

Referring to FIG. 9C, the patterns of the sacrificial layer 1' are transferred to the electrode 2b by a lithography method, forming wells 2b' in the electrode.

Figure 9D:
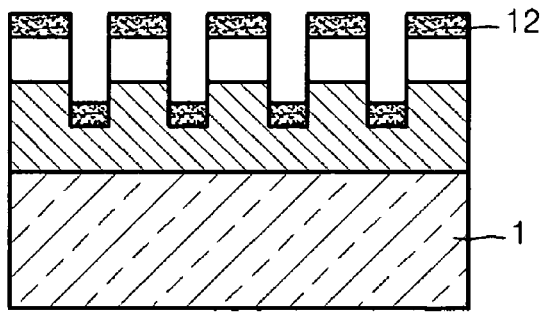

Referring to FIG. 9D, a precursor material 12 is deposited into the wells and onto the sacrificial layer.

Figure 9E:
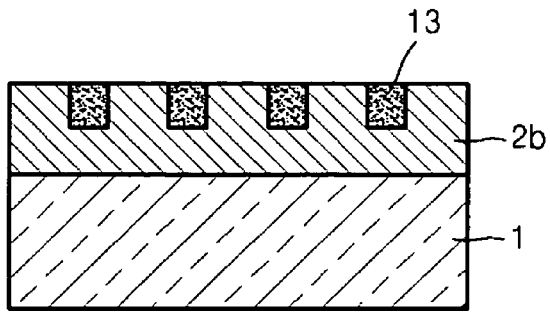

Referring to FIG. 9E, the sacrificial layer is removed and the precursor material in the wells is transformed into embedded ferroelectric material 13.

FIGS. 10A through 10D illustrate another embodiment of a method of manufacturing embedded type features.

Figure 10A:
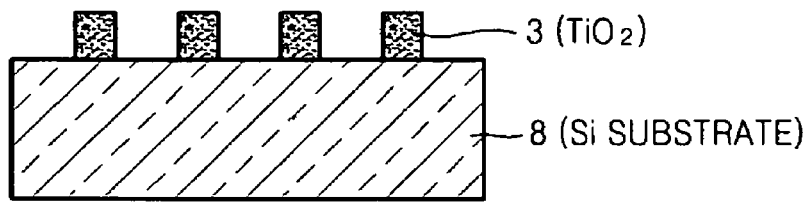
FIGS. 10A through 10D illustrate a method of manufacturing, patterned ferroelectric media according to another embodiment of the present invention.

Referring to FIG. 10A, $TiO_2$ precursor features 3 are formed on an additional template substrate, for example, an Si template substrate 8. The $TiO_2$ precursor features 3 can be formed using the above-mentioned methods.

Figure 10B:
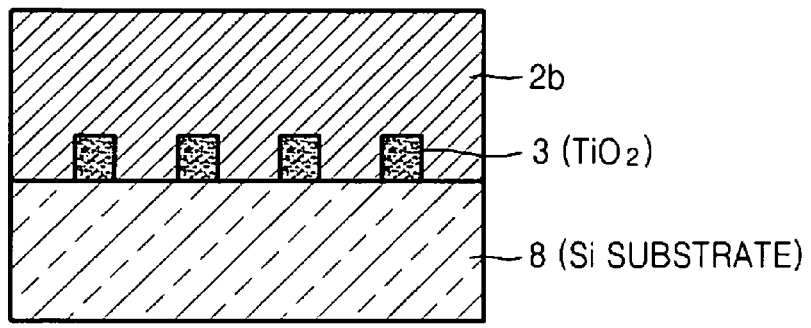

Referring to FIG. 10B, an electrode 2b is formed on the $TiO_2$ precursor features 3. The electrode 2b is deposited to a sufficient thickness, that is, to a thickness larger than a height of each $TiO_2$ precursor feature 3, thereby completely burying the $TiO_2$ precursor features 3.

Figure 10C:
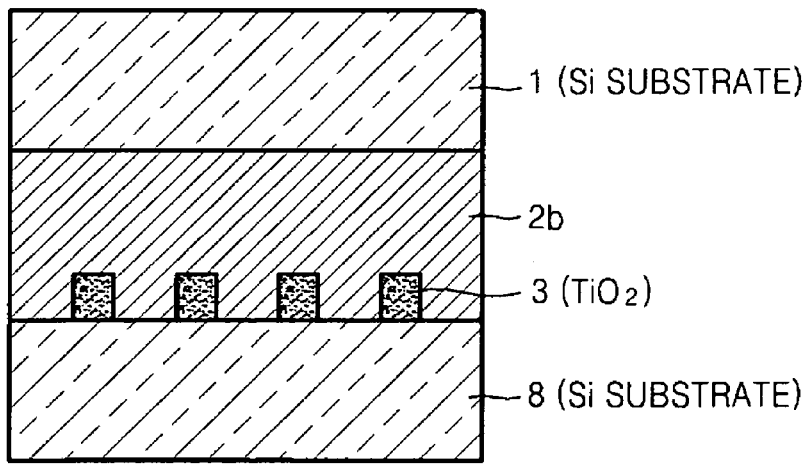

Referring to FIG. 10C, the substrate 1, which can be a Si substrate, is bonded on the electrode 2b. Wafer bonding accompanies activation treatment of a wafer surface, as is well known to those of ordinary skill in this field of art.

Figure 10D:
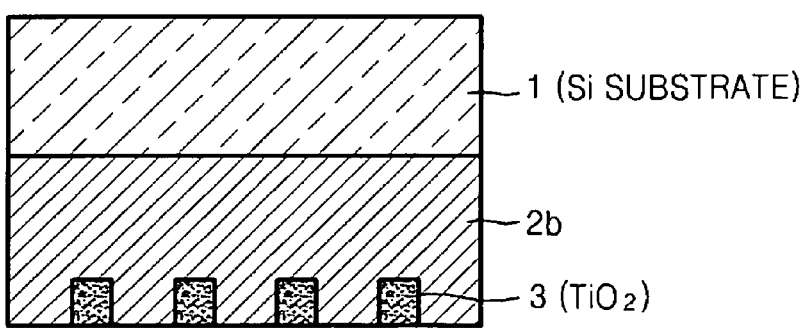

Referring to FIG. 10D, the template substrate 8 is peeled off, thereby exposing surfaces of the $TiO_2$ precursor features 3. As such, the $TiO_2$ precursor features 3 embedded in the electrode 2b are obtained on the substrate 1.

FIGS. 11A through 11F are modified examples of the embodiment of FIGS. 10A through 10D in which the $TiO_2$ precursor features 3 are formed on the template substrate 8, which illustrate another embodiment considering volumetric expansion that occurs when precursor features 3 embedded in an electrode 2 are transformed into ferroelectrics.

Figure 11A:
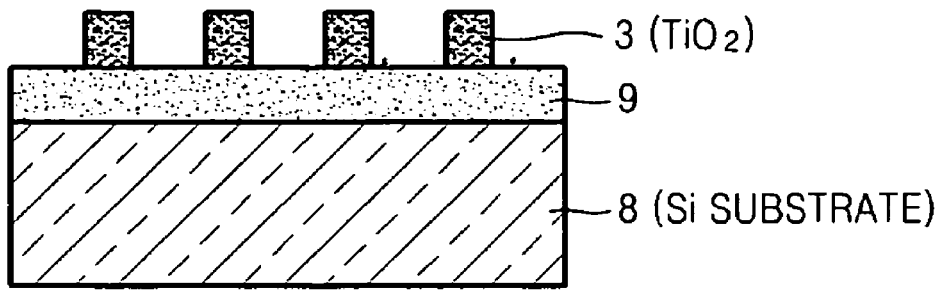
FIGS. 11A through 11F illustrate a method of manufacturing patterned ferroelectric media according to another embodiment of the present invention.

Referring to FIG. 11A, a compensation layer 9 having a predetermined thickness is formed on a template substrate 8, and a plurality of precursor features 3 are formed using the above-mentioned method.

Figure 11B:
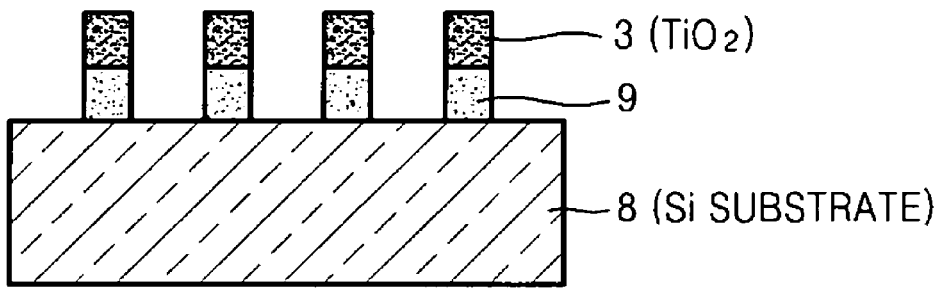

Referring to FIG. 11B, the compensation layer 9 is patterned using the precursor features 3 as a mask so that the compensation layer remains only on lower portions of the precursor features 3.

Figure 11C:
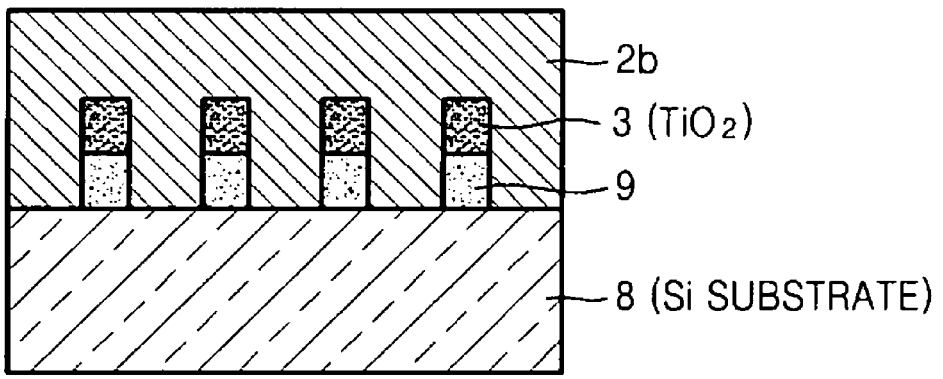

Referring to FIG. 11C, an electrode 2b is formed on the precursor features 3. A material, such as Pt for the electrode 2b is deposited to a sufficient thickness, that is, to a thickness larger than a height of each precursor feature 3, thereby completely burying the precursor features 3.

Figure 11D:
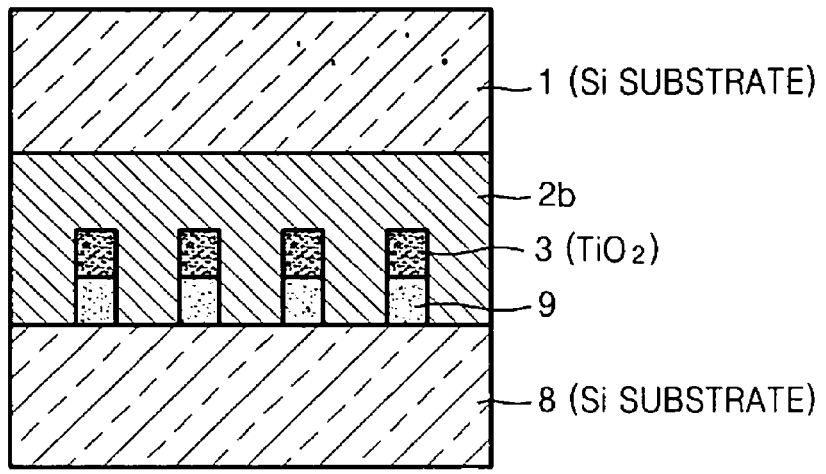

Referring to FIG. 11D, the substrate 1, which can be a Si substrate, is bonded on the electrode 2b. Wafer bonding accompanies activation treatment of a wafer surface, as is well known in this field of art.

Figure 11E:
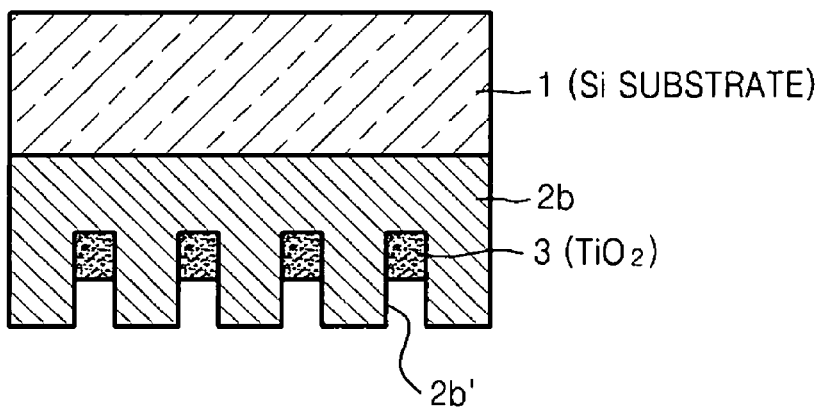

Referring to FIG. 11E, the template substrate 8 is peeled off from the electrode 2 and the compensation layer 9 is removed, thereby exposing surfaces of the precursor features 3 from the electrode 2b.

Figure 11F:
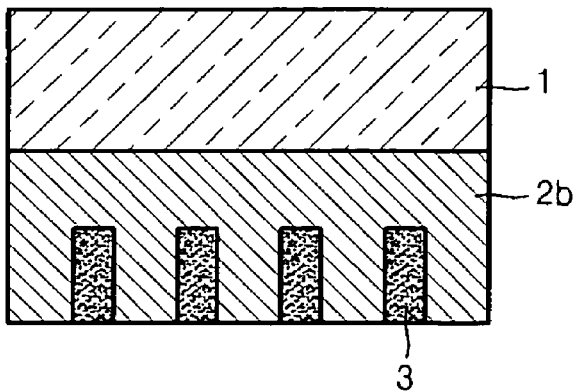

Referring to FIG. 11F, a source species, for example, PbO, reacts with the precursor feature 3 embedded in each of wells 2b', thereby obtaining ferroelectric features 3. In this case, due to a volumetric increase, the surface of the ferroelectric features 3 is lifted up to an opening of each well 2b'. To this end, the thickness of the compensation layer 9 should also be properly adjusted.

<Ferroelectric Feature Transformation>

The patterned precursor features 3 obtained by the above-described processes are transformed into ferroelectric features 3 by thermal chemical combination with source species.

Figure 12:
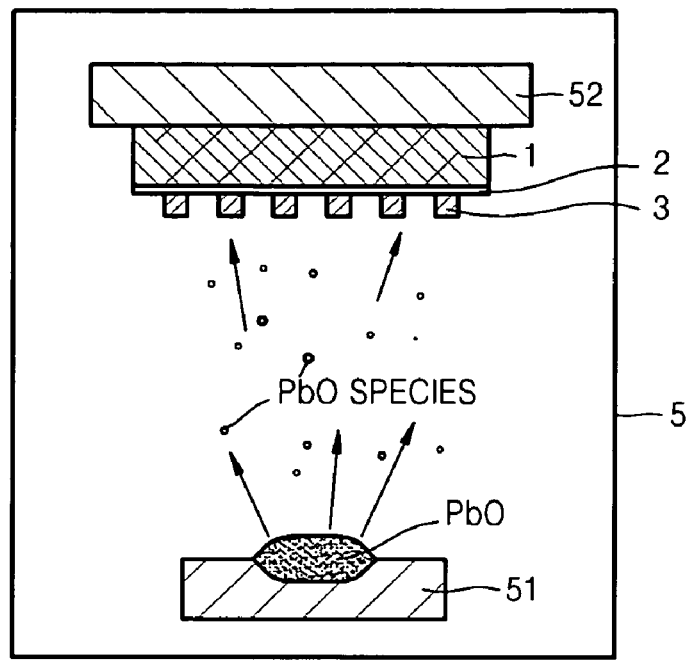
FIG. 12 illustrates a method of transforming patterned precursor features into ferroelectrics.

FIG. 12 illustrates a method of transforming patterned precursor features into ferroelectrics.

Referring to FIG. 12, PbO species are generated from a PbO source 51. The PbO source can be solid PbO which is heated to a certain temperature, such as to evaporate PbO and therefore generate a certain PbO vapor pressure. This can be done at ambient pressure and also in vacuum. At ambient pressure, the vaporization temperature should be more than about 550° C., but the temperature can be lower under vacuum. Another PbO source can be a Pb or PbO target from which PbO is sputtered in an oxygen/argon-containing atmosphere under reduced pressure. In this case, the vapor pressure of PbO can be controlled at much higher values than in the case of thermal evaporation. Other possible sources can be organometallic volatile Pb or PbO compounds. If a vacuum is used for processing using sputtering, the pressure should be lower than 300 mT. Features 3 on the substrate 1 are contained in the same chamber as the source 51. Using sputtering or evaporation, there will be a directional PbO flux, therefore the features 3 on the substrate 1 face the source. The metal electrode 2 and the features 3 are heated using a heater 52. The metal electrode 2 formed of Pt does not react with the PbO gas. PbO gas is adsorbed on the electrode surface and travels along the surface (surface diffusion) before it is re-evaporated from the electrode 2. Re-evaporation takes place above a certain temperature (about 400° C. in the current embodiment) so that PbO is not deposited on the metal electrode 2. PbO gas selectively reacts with the features 3 formed of $Ti/TiO_2$ so that $Ti/TiO_2$ can be transformed into $PbTiO_3$ which is a ferroelectric substance. PbO species can be delivered to the precursor feature in two ways: (1) directly from the gas phase, and (2) more importantly, reaction can also take place when adsorbed PbO species contact a precursor feature during surface diffusion on the electrode 2. The temperature of the heater 52 should be such that reaction and re-evaporation take place. It might be the case that under certain conditions, the incoming PbO flux is larger than the flux of re-evaporating species, and PbO deposition takes place on the precursor feature and on the electrode. To prevent this, a pulsed-type reaction may be performed where the PbO flux is periodically reduced. During this period, remaining species can re-evaporate or react with the precursor. This can be achieved by directly controlling the source but also by using a shutter on the features, or by rotating the features through the PbO flux, or by periodically changing the distance of the features to the PbO source.

Here, Zr or $ZrO_2$ (hereinafter, referred to as $Zr/ZrO_2$) may be included in the features 3 formed of $Ti/TiO_2$. The features 3 containing Ti and Zr react with PbO and are transformed into PZT ($Pb(Zr, Ti)O_3$).

The above-described method of manufacturing the patterned ferroelectric features, that is, a ferroelectric feature array, according to the present invention is characterized in that the precursor film is patterned and defect-free ferroelectric PZT is obtained by reaction of the precursor features with PbO. That is, according to the present invention, features corresponding to memory bits are formed from $Ti/TiO_2$ and $Zr/ZrO_2$ and then, PTO and PZT ferroelectric substances are obtained by reaction with PbO.

As described above, a silicon or sapphire substrate can be used as the substrate. A material that does not react with PbO that is finally supplied to obtain a ferroelectric substance, for example, Pt can be used for the metal electrode. In addition, features corresponding to memory bits are formed using a precursor such as Ti, $TiO_2$, Zr or $ZrO_2$ and then, PbO which is a source material is finally supplied to the features, thereby obtaining desired PTO or PZT.

When Pb is used as a source material, oxygen is injected to obtain PbO.

As described above, in order to obtain Pb or PbO species, the PbO species can be obtained using thermal evaporation using an electrical heating body or by sputtering, pulsed laser deposition, or from volatile organometallic compounds. The PbO species generated by evaporation or sputtering quickly travel on the substrate in the vacuum chamber and are adsorbed on the electrode of the heated substrate surface and the surface of the feature. At this time, as described above, the PbO species do not react with the electrode but react with the features formed of a precursor material, thereby obtaining PTO or PZT. As described above, the heater on which the substrate is mounted is heated to a temperature over 400° C. to promote reaction between the PbO source and the precursor and to enhance surface diffusion, and further to re-evaporate the PbO species adsorbed on the electrode and thereby prevent the PbO species from remaining on the electrode. The reactively obtained PTO or PZT diffuses inwards into the features while the reaction is carried out. The portion of reacted PTO or PZT in the precursor depends on the processing time. Thus, a ferroelectric pattern having no defects can be obtained.

An advantage of the present invention is that media having a patterned ferroelectric film can be manufactured using a simple process compared to the prior art. That is, a prior art patterning method that may damage ferroelectrics is not performed, and the ferroelectric film is patterned in a precursor state before the ferroelectrics are formed. As such, a ferroelectric media having no damage can be easily obtained. Considering that patterning of the precursor features is easier than patterning of the ferroelectric substance, the method of patterned ferroelectric media according to the present invention has the advantage that an economic profit can be obtained and particularly, a precursor which is a base for the patterned ferroelectric feature, for example, Ti or $TiO_2$, can be cold-or hot-deposited.

In addition, the thickness or height of the $TiO_2$ precursor thin film can be reduced to less than 10 nm using $TiO_2$ having a low surface energy and Pt having a high surface energy.

In addition, the microstructure of the ferroelectric features using the present invention is different compared with standard deposition processes. Standard deposition processes, such as for example sputtering, are governed by surface nucleation and growth, and surface diffusion plays an important role. Especially at high temperatures (above 500 C.), using conventional processes, surface diffusion leads to large grain sizes which is undesirable for a media used in probe storage devices. In comparison, this invention provides a means to achieve very small grain sizes: First, the precursor layer may be produced at low temperatures and therefore small grain sizes, and second, the formation of the ferroelectric material is governed by internal diffusion and internal nucleation. In the case of internal nucleation, an already solid material is transformed into another solid. In those circumstances, each PbO captured by $TiO_2$ will nucleate PTO. This provides an ultrahigh internal nucleation site density, and therefore, an ultrafine grained ferroelectric material can be obtained.

Transformation of the precursor into the ferroelectric is controlled by diffusion of source species. The transformation is ended by shutting off supply of a source species and by decreasing the temperature to be less than about 400° C. As described above, since PbO does not react with Pt, the probability that most of the PbO reacts only with the $TiO_2$ precursor is increased.

Figure 13:
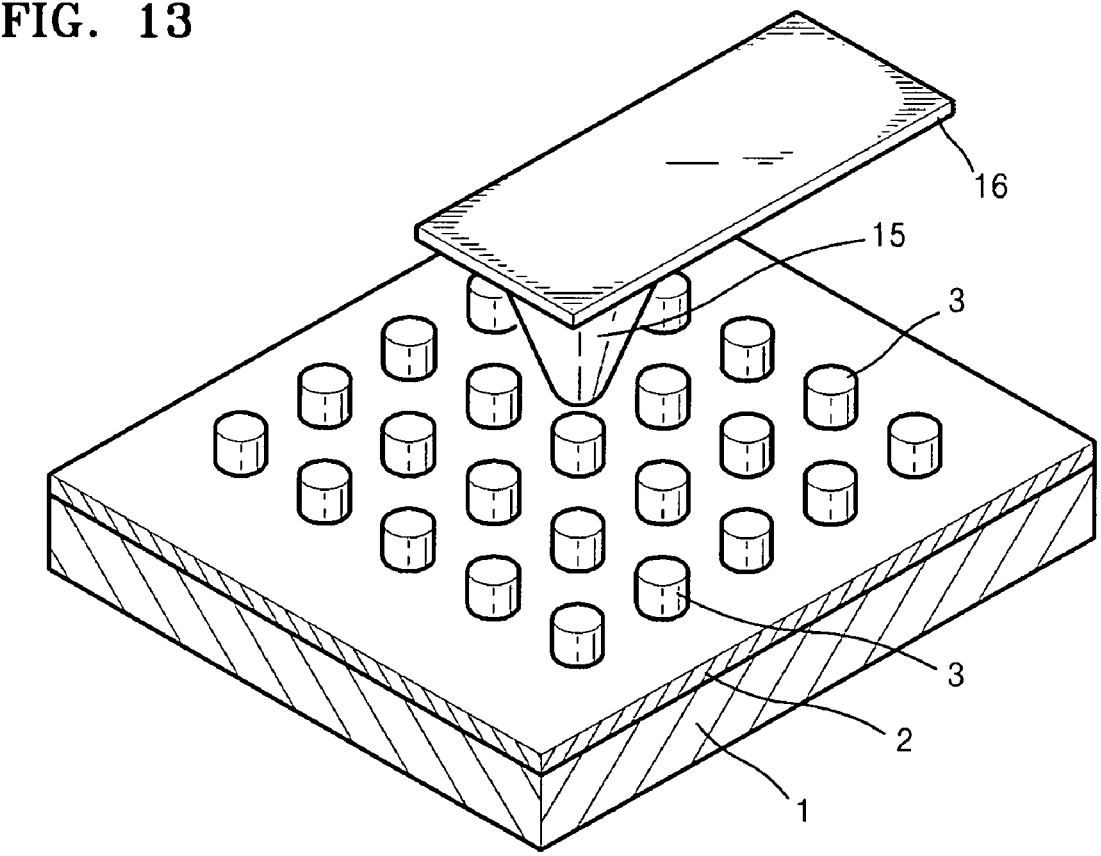
FIG. 13 is a schematic view of an information recording device using a patterned ferroelectric film manufactured according to the present invention.

FIG. 13 is a schematic view of an information recording device using a patterned ferroelectric film manufactured according to the present invention.

Referring to FIG. 13, a plurality of ferroelectric features 3 of a patterned ferroelectric film are arranged on an electrode 2 of a substrate 1, and a probe 15 for recording and reading information is disposed on the ferroelectric features 3. The probe is supported by a lever 16.

The plurality of ferroelectric features 3 may be of a non-embedded substrate 1, or an embedded type in which the ferroelectric features 3 are embedded in the electrode 2.

As described above, in the method of manufacturing patterned ferroelectric media according to the present invention, a patterned ferroelectric film having no defects can be formed. In addition, a patterned ferroelectric film having good physical properties can also be obtained. The present invention can also be applied to patterning of different ferroelectrics formed using a precursor and a source material, other than PTO and PZT. Moreover, the present invention is not limited to ferroelectrics but can, for example, be applied to ferromagnetics.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of manufacturing patterned ferroelectric media having a plurality of ferroelectric features, the method comprising:

forming an electrode on a substrate;

producing a precursor at a temperature lower than 500° C. so as to produce a precursor material;

forming precursor features having a pattern corresponding to the formation of said ferroelectric features on the electrode, said precursor features being transformed into the ferroelectric features; and reacting a source material with the patterned precursor features to transform the precursor features into ferroelectric features, wherein the reaction between the source material and the precursor features occurs while the source material is being supplied, the transformation of the precursor features is governed by internal diffusion and internal nucleation of the source material to provide said ferroelectric features, and the reaction is a pulsed reaction whereby the source material is periodically reduced.

2. The method of claim 1, wherein the electrode is formed to have a plurality of wells, and the features are formed in the wells.

3. The method of claim 2, wherein the ferroelectric features comprise a ferroelectric material selected from the group consisting of $PbTiO_3$ and $Pb(Zr, Ti)O_3$.

4. The method of claim 2, wherein the precursor comprises $Ti/TiO_2$.

5. The method of claim 2, wherein the precursor comprises $Ti/TiO_2$ and $Zr/ZrO_2$.

6. The method of claim 2, which comprises generating the source material under ambient pressure by thermal evaporation to induce reaction with the precursor.

7. The method of claim 6, which further comprises heating the electrode structure in which the precursor features are combined with a heater to thereby transform the precursor into a ferroelectric material, wherein the electrode is formed of Pt, the precursor features comprise $Ti/TiO_2$, and the source material is PbO.

8. The method of claim 2, which comprises generating the source material under vaccum to induce reaction with the precursor.

9. The method of claim 8, which further comprises heating the electrode structure in which the precursor features are combined with a heater, to thereby transform the precursor into a ferroelectric material, wherein the electrode is formed of Pt, the precursor features comprise $Ti/TiO_2$, and the source material is PbO.

10. The method of claim 2, wherein the electrode is formed of Pt, the precursor features comprise $Ti/TiO_2$, and the source material is PbO.

11. The method of claim 10, which further comprises heating the electrode structure in which the precursor features are combined with a heater, to thereby transform the precursor into a ferroelectric material.

12. The method of claim 2, which comprises generating the source material under vacuum by sputtering, evaporation, pulse laser deposition or chemical vapor deposition.

13. The method of claim 1, wherein the upper surface of the electrode is even, and the features are formed on the upper surface of the electrode.

14. The method of claim 13, wherein the ferroelectric features comprise a ferroelectric material selected from the group consisting of $PbTiO_3$ and $Pb(Zr, Ti)O_3$.

15. The method of claim 13, wherein the precursor comprises $Ti/TiO_2$.

16. The method of claim 13, wherein the precursor comprises $Ti/TiO_2$ and $Zr/ZrO_2$.

17. The method of claim 13, which comprises generating the source material under ambient pressure by thermal evaporation to induce reaction with the precursor.

18. The method of claim 17 which further comprises heating the electrode structure in which the patterned features are combined with a heater, to thereby transform the precursor into a ferroelectric material, wherein the electrode is formed of Pt, the patterned features formed on the electrode comprise $Ti/TiO_2$, and the source material is PbO.

19. The method of claim 13, which comprises generating the source material under vacuum to induce reaction with the precursor.

20. The method of claim 19, which further comprises heating the electrode structure in which the patterned features are combined with a heater, to thereby transform the precursor into a ferroelectric material, wherein the electrode is formed of Pt, the patterned features formed on the electrode comprise $Ti/TiO_2$, and the source material is PbO.

21. The method of claim 19, which comprises generating the source material under vacuum by sputtering, evaporation or pulse laser deposition.

22. The method of claim 13, wherein the electrode is formed of Pt, the patterned features formed on the electrode comprise $Ti/TiO_2$, and the source material is PbO.

23. The method of claim 22, which further comprises heating the electrode structure in which the patterned features are combined with a heater, to thereby transform the precursor into a ferroelectric material.

* * * * *